April 12, 1932. V. VALLETTA 1,854,082
VARIABLE SPEED GEARING, PARTICULARLY FOR MOTOR VEHICLES
Original Filed Nov. 19, 1929
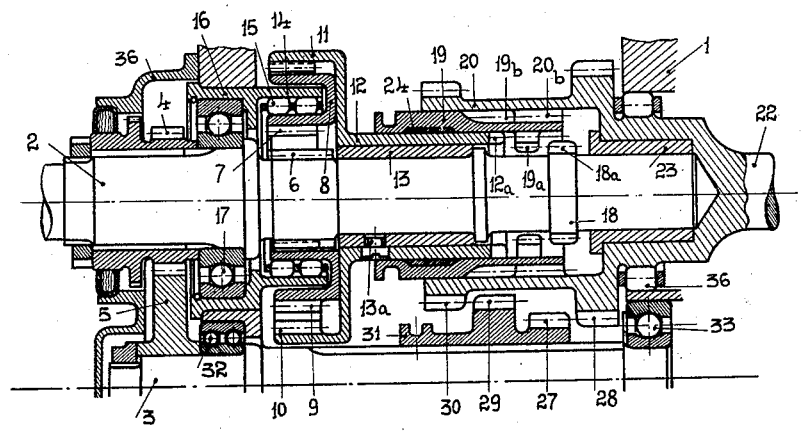
Inventor
Vittorio Valletta,
By Henry Orth Jr
atty.

Patented Apr. 12, 1932

1,854,082

UNITED STATES PATENT OFFICE

VITTORIO VALLETTA, OF TURIN, ITALY, ASSIGNOR TO FIAT SOCIETA ANONIMA, OF TURIN, ITALY

VARIABLE SPEED GEARING, PARTICULARLY FOR MOTOR VEHICLES

Original application filed November 19, 1929, Serial No. 408,292, and in Italy November 24, 1928. Divided and this application filed September 18, 1930. Serial No. 482,839.

This invention refers to a change speed gear for motor vehicles comprising sets of internally toothed wheels of the type described in the copending patent application, Ser. No. 351,971 and is a division of my Patent, 1,796,067, granted March 10, 1921. The object of this invention is to simplify the construction from the standpoint of manufacture and mounting, without altering the size of the members of the mechanism.

Another object of my invention is to strengthen the annular support for the internally and externally toothed gear in order to improve the rigidity of mesh of said gear.

Other objects and advantages of my invention will be set forth in the following specification, in which reference is made to the accompanying drawing which is an axial vertical section through a variable speed gearing of the type specified, wherein the annular support for the C-shaped ring is made shorter and continuous, and the toothed wheel transmitting motion from the engine shaft to the counter-shaft is arranged outside the gear box.

Referring to the drawing 1 denotes the gear box through which are fitted the engine shaft 2 and the bell-shaped end of the transmission shaft 22.

The engine shaft 2 drives a C-shaped ring 8 having an internal set of teeth 7 meshing with the pinion 6 of the engine shaft and an external set of teeth 9 meshing with the internal set of teeth 10 of the crown 11 carried by the sleeve 12 mounted on the engine shaft 2 by means of a bush bearing 13.

The C-shaped ring 8 is supported by an annular flange 14 excentrically projecting from the member 16 fixed to the front wall of the gear box 1 and coaxial with the engine shaft, said member housing the ball bearing 17 for the engine shaft 2. A set of rollers 15 are inserted between the C-shaped ring 8 and the annular flange end placed in the hollow of the C-shaped ring in the same plane as the sets of teeth 7 and 9.

The annular support 14—16 is very short and requires no gap, through which the toothed wheels transmitting motion from the engine shaft to the counter-shaft may engage, while such a gap was required in the construction according to the copending application.

The toothed wheel 5 keyed on the counter-shaft 3 is situated outside the gear box 1 and meshes with a toothed wheel 4 keyed on a portion of the engine shaft 2 external to the gear box. The wheels 4 and 5 are protected by the cover 36.

The transmission shaft 22 carries a single bell 20 housing the bush bearing 23 in the same plane as the roller bearing 36 mounted in the rear wall of the gear box 1 and supporting in the usual manner the transmission shaft 22. A bush bearing 24 is arranged within a sleeve 19 capable of axial displacement, but kept against rotation within the bell 20. Said sleeve 19 is provided with dog teeth 19a adapted to alternately engage the teeth 12a and 18a, respectively, of the sleeve 12 and crown 18 of the engine shaft 2; the dog teeth 19a of the sleeve 19 being twice as high as the teeth 12a and 18a, because it is necessary from a constructional standpoint to make the sleeve 12 with an inner diameter equal to or larger than that of the set of teeth 18a.

For the same reason the bush bearing 13 is diametrically subdivided into two parts which are secured by screws 13a to the sleeve 12 and hold this latter against a shoulder on the shaft 2.

The sleeve 19 is slidably keyed to the bell 20 by means of teeth 20b on the bell engaging grooves 19b on the sleeve.

The bell-shaped end of the transmission shaft is provided with toothed crowns 28 and 30 with which may alternatively engage the pinions 27 and 29 respectively, said pinions being rigidly connected together and mounted on the counter-shaft 3 for axial displacement by means of the usual collar 31.

The counter-shaft 3 is supported in the usual manner by the front and rear wall of the casing 1 through ball bearings 32 and 33 respectively.

The working of the above described variable speed gearing is as follows; supposing the parts in the idler position as shown in the drawing, I move the slidable pinions on the counter-shaft 3 to right hand until the pinion 27 engages the toothed crown 28 and obtain the first speed, then displace the slidable pinions to left hand for engaging the pinion 29 with the toothed crown 30 and obtain the second speed. For the third speed I bring the slidable pinions in idler position and displace the sleeve 19 to left hand until the teeth 19a engage the teeth 12a; the direct drive is obtained by bringing the teeth 19a of the sleeve 19 in mesh with the teeth 18a on the engine shaft.

What I claim is:

1. Variable speed gearing comprising, in combination with a box, a driving shaft and a driven shaft mounted in said box, one end of said driven shaft being in the shape of a bell, in which the driving shaft is co-axially supported, an annular member traversed by the driving shaft and secured to the box excentrically with respect to said shafts, a C-shaped ring supported by said excentric annular member and having an inner set of teeth and an outer set of teeth, a pinion keyed on the driving shaft meshing with said internal set of teeth, a sleeve loosely mounted on said driving shaft, a set of internal teeth fast with said sleeve and meshing with said external set of teeth of the C-shaped ring, dog teeth on said sleeve and on said engine shaft, a sleeve movable in the bell-shaped end of the transmission shaft and provided with dog teeth that may be alternatively brought into gear with the dog teeth of the first mentioned sleeve and of said engine shaft, two toothed crowns on said bell, a counter-shaft, a toothed wheel on said countershaft meshing with a toothed wheel on the engine shaft arranged externally of said annular excentric member and pinions mounted for axial displacement but kept against rotation on said countershaft and that may be alternatively thrown into gear with the corresponding toothed crowns on said bell.

2. Variable speed gearing comprising, in combination with a box, a driving shaft and a driven shaft mounted in said box, one end of said driven shaft being in the shape of a bell, in which the driving shaft is co-axially supported, an annular member traversed by the driving shaft and secured to the box excentrically with respect to said shafts, a C-shaped ring, supported by said excentric annular member and having an inner set of teeth and an outer set of teeth, a pinion keyed on the driving shaft meshing with said internal set of teeth, a sleeve loosely mounted on said driving shaft, a set of internal teeth fast with said sleeve and meshing with said external set of teeth of the C-shaped ring, dog teeth on said sleeve and on said engine shaft, a sleeve movable in the bell shaped end of the transmission shaft and provided with dog teeth that may be alternatively brought into gear with the dog teeth of the first mentioned sleeve and of said engine shaft, two toothed crowns on the bell, a counter-shaft, a toothed wheel on an extension of said counter-shaft external to the gear box, a toothed wheel on the engine shaft externally of the gear box and meshing with the toothed wheel on the counter-shaft, a casing for protecting said toothed wheel fixed to the gear box and pinions mounted for axial displacement but kept against rotation on said countershaft and that may be alternatively thrown into gear with the corresponding crowns on said bell.

In testimony that I claim the foregoing as my invention, I have signed my name.

VITTORIO VALLETTA.